(12) United States Patent
Nishimura et al.

(10) Patent No.: US 11,068,727 B2
(45) Date of Patent: Jul. 20, 2021

(54) INFORMATION PROCESSING SYSTEM, NON-TRANSITORY STORAGE MEDIUM STORING PROGRAM, AND CONTROL METHOD

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP); Jun Goto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 121 days.

(21) Appl. No.: 16/397,504

(22) Filed: Apr. 29, 2019

(65) Prior Publication Data

US 2020/0042802 A1 Feb. 6, 2020

(30) Foreign Application Priority Data

Aug. 3, 2018 (JP) .............................. JP2018-146632

(51) Int. Cl.
*G06K 9/00* (2006.01)
(52) U.S. Cl.
CPC ................................ *G06K 9/00805* (2013.01)
(58) Field of Classification Search
None
See application file for complete search history.

(56) References Cited

U.S. PATENT DOCUMENTS

| 2015/0161881 A1* | 6/2015 | Takemura | G06K 9/00798 348/148 |
| 2016/0209511 A1* | 7/2016 | Dolinar | G06K 9/6278 |
| 2018/0067966 A1* | 3/2018 | Oder | G05D 1/0257 |

FOREIGN PATENT DOCUMENTS

JP 2001-124577 A 5/2001

* cited by examiner

*Primary Examiner* — Wei Wen Yang
(74) *Attorney, Agent, or Firm* — Oliff PLC

(57) ABSTRACT

An information processing system includes a vehicle and a server. The vehicle generates a plurality of captured still images in which scenery outside the vehicle is captured, and acquires position information of the vehicle. The vehicle or the server executes a detection process of detecting a predetermined object in a captured moving image that includes each of the plurality of captured still images as a frame, calculates the number of times that the predetermined object is detected of a section of a predetermined amount of time while changing a position of the section, and determines position information of a candidate start point of a traffic disturbance site on the road based on the position information of the vehicle at a time when at least one captured still image included in the section when the number of times that the predetermined object is detected exceeds a first reference number, is generated.

12 Claims, 11 Drawing Sheets

FIG. 9

| IDENTIFICATION INFORMATION OF ROAD | IDENTIFICATION INFORMATION OF VEHICLE | POSITION INFORMATION OF CANDIDATE START POINT | POSITION INFORMATION OF CANDIDATE END POINT | CANDIDATE START POINT IMAGE | CANDIDATE END POINT IMAGE |
|---|---|---|---|---|---|
| R1 | V1 | P1 | Q1 | Pi1 | Qi1 |
|  | V2 | P2 | Q2 | Pi2 | Qi2 |
|  | ... | ... | ... | ... | ... |

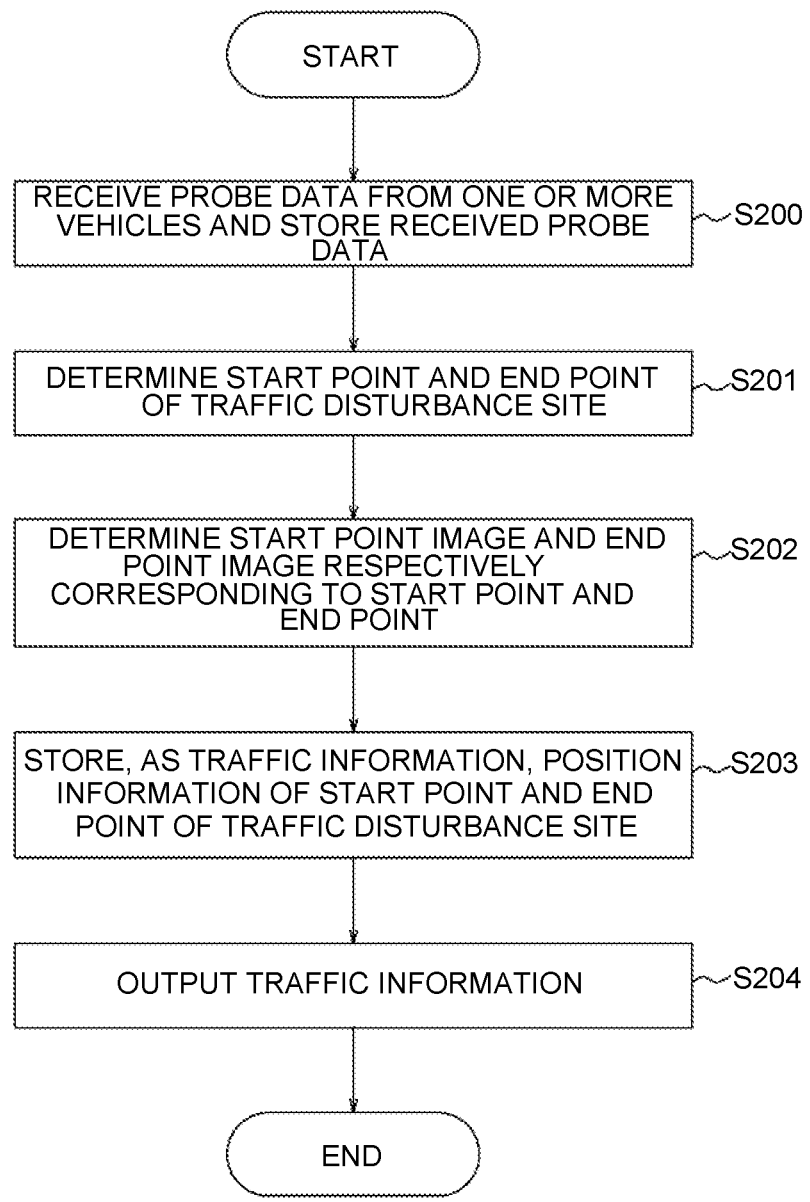

though conventional traffic information may include information showing an approximate location in which the roadwork is taking place, the traffic information does not include detailed information showing a roadwork point. For this reason, for example, even if a map is displayed with the approximate location in which the roadwork is taking place, using the conventional traffic information, and presented to a user, the user cannot accurately identify the roadwork point. As such, with the conventional traffic information, the user cannot be provided with the accurate roadwork point. Therefore, the traffic information stored in the traffic information providing center is required to become detailed.

INFORMATION PROCESSING SYSTEM, NON-TRANSITORY STORAGE MEDIUM STORING PROGRAM, AND CONTROL METHOD

INCORPORATION BY REFERENCE

The disclosure of Japanese Patent Application No. 2018-146632 filed on Aug. 3, 2018 including the specification, drawings and abstract is incorporated herein by reference in its entirety.

BACKGROUND

1. Technical Field

The present disclosure relates to an information processing system, a non-transitory storage medium storing a program, and a control method.

2. Description of Related Art

Conventionally, the provision of conventional traffic information stored in a traffic information providing center has become commonly provided. For example, Japanese Unexamined Patent Application Publication No. 2001-124577 discloses an apparatus that displays graphics showing a tendency in a traffic jam on a screen map, by using information received from a traffic information providing center.

SUMMARY

Traffic information stored in a traffic information providing center includes information showing traffic disturbances, such as, roadwork. Although conventional traffic information may include information showing an approximate location in which the roadwork is taking place, the traffic information does not include detailed information showing a roadwork point. For this reason, for example, even if a map is displayed with the approximate location in which the roadwork is taking place, using the conventional traffic information, and presented to a user, the user cannot accurately identify the roadwork point. As such, with the conventional traffic information, the user cannot be provided with the accurate roadwork point. Therefore, the traffic information stored in the traffic information providing center is required to become detailed.

The present disclosure provides an information processing system, a non-transitory storage medium storing a program, and a control method that enable traffic information stored in a traffic information providing center to become detailed.

An information processing system according to a first aspect of the present disclosure includes a vehicle, and a server configured to communicate with the vehicle. The vehicle is configured to generate a plurality of captured still images in which scenery outside the vehicle is captured while travelling on a road, and simultaneously acquire position information of the vehicle at a time when each of the plurality of captured still images is generated. The vehicle or the server is configured to execute a detection process of detecting a predetermined object in a captured moving image that includes each of the plurality of captured still images as a frame, calculate the number of times that the predetermined object is detected in a section of a predetermined amount of time of the captured moving image while changing a position of the section in the captured moving image, and determine position information of a candidate start point of a traffic disturbance site on the road, based on the position information of the vehicle at a time when at least one captured still image included in the section when the number of times that the predetermined object is detected exceeds a first reference number, is generated. The server is configured to determine position information of a start point of the traffic disturbance site, based on the position information of the candidate start point determined associated with the vehicle, and output the position information of the start point of the traffic disturbance site.

The vehicle or the server may determine, as a start point image corresponding to the start point, any one of the captured still images included in the section when the number of times that the predetermined object is detected exceeds the first reference number. The server may output the start point image.

The vehicle may generate the plurality of captured still images when the vehicle is travelling at a speed equal to or above a predetermined value.

The information processing system may include a plurality of vehicles. The server may determine the position information of the start point of the traffic disturbance site, based on position information of a plurality of candidate start points respectively determined associated with the plurality of vehicles.

The vehicle or the server may determine position information of a candidate end point of the traffic disturbance site, based on the position information of the vehicle at the time when at least one captured still image included in the section when the number of times that the predetermined object is detected is equal to or below a second reference number, is generated. The server may determine position information of an end point of the traffic disturbance site, based on the position information of the candidate end point determined associated with the vehicle, and output the position information of the end point of the traffic disturbance site.

The vehicle or the server may determine, as an end point image corresponding to the end point, any one of the captured still images included in the section when the number of times that the predetermined object is detected is equal to or below the second reference number. The server may output the end point image.

The second reference number may be equal to or below the first reference number.

The information processing system may include a plurality of vehicles. The server may determine the position information of the end point of the traffic disturbance site, based on position information of a plurality of candidate end points respectively determined associated with the plurality of vehicles.

A second aspect of the present disclosure is a non-transitory storage medium storing a program. The program causes an information processing apparatus to execute a step of acquiring a plurality of captured still images in which a vehicle travelling on a road captures scenery outside the vehicle, a step of acquiring position information of the vehicle at a time when each of the plurality of captured still images is generated, a step of starting a detection process of detecting a predetermined object in a captured moving image that includes each of the plurality of captured still images as a frame, a step of calculating the number of times that the predetermined object is detected in a section of a predetermined amount of time of the captured moving image while changing a position of the section in the captured moving image, a step of specifying at least one captured still image included in the section when the number of times that the predetermined object is detected exceeds a first reference number, and a step of determining position information of a candidate start point of a traffic disturbance site on the road, based on the position information of the vehicle at a time when the at least one specified captured still image is generated.

A third aspect of the present disclosure is a method of controlling an information processing apparatus. The method includes a step of acquiring a plurality of captured still images in which a vehicle travelling on a road captures scenery outside the vehicle, a step of acquiring position information of the vehicle at a time when each of the plurality of captured still images is generated, a step of starting a detection process of detecting a predetermined object in a captured moving image that includes each of the plurality of captured still images as a frame, a step of calculating the number of times that the predetermined object is detected in a section of a predetermined amount of time of the captured moving image while changing a position of the section in the captured moving image, a step of specifying at least one captured still image included in the section when the number of times that the predetermined object is detected exceeds a first reference number, and a step of determining position information of a candidate start point of a traffic disturbance site on the road, based on the position information of the vehicle at a time when the at least one specified captured still image is generated.

With the information processing system, non-transitory storage medium storing a program, and control method according to each aspect of the present disclosure, it is possible for the traffic information stored in a traffic information providing center to become detailed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 9 is a table illustrating exemplified information stored in the server;

FIG. 11 is a flowchart illustrating an operation of the server.

DETAILED DESCRIPTION OF EMBODIMENTS

Hereinafter, an embodiment of the present disclosure will be described.

Configuration of Information Processing System

Figure 1:
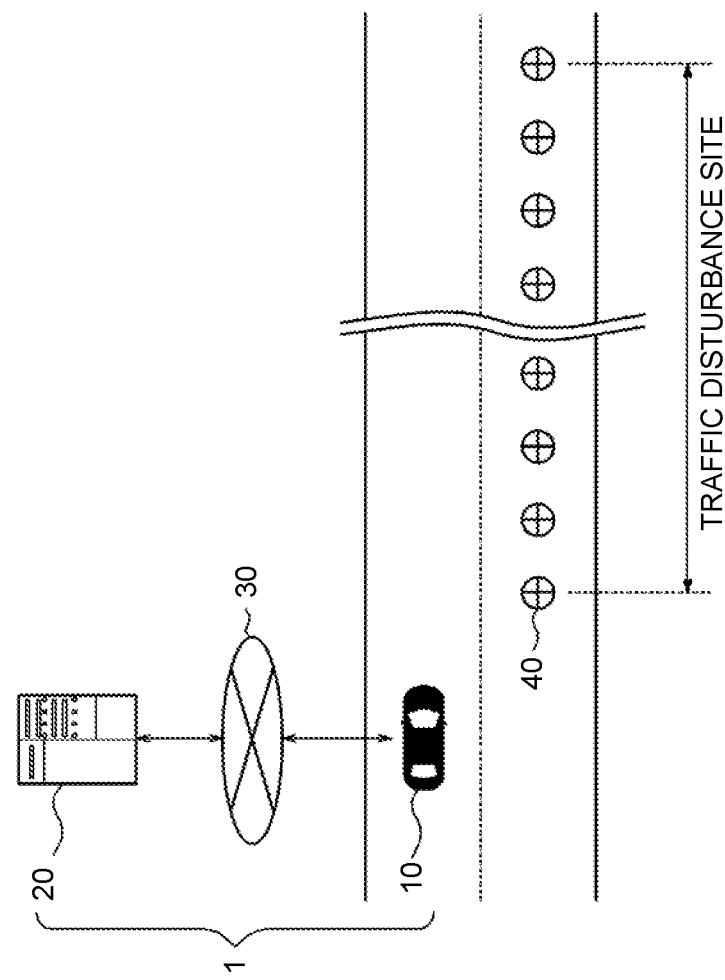
FIG. 1 is a diagram schematically illustrating a configuration of an information processing system according to one embodiment of the present disclosure.

An overview of an information processing system 1 according to one embodiment of the present disclosure will be described below with reference to FIG. 1. The information processing system 1 includes one or more vehicles 10 and a server 20. Examples of the vehicle 10 include a car, but are not limited thereto, and may include any vehicle. For convenience of description, FIG. 1 illustrates only one vehicle 10. The server 20 includes one or a plurality of server apparatuses that can communicate with one another. The server 20 may be installed at, for example, a traffic information providing center. The server 20 can communicate with a client via a network 30 that includes, for example, a mobile communication network and the Internet. In the present embodiment, examples of the client include one or more vehicles 10. Accordingly, each vehicle 10 and the server 20 can communicate with each other via the network 30. However, the client that can communicate with the server 20 is not limited to the vehicle 10, and may include any information processing apparatus, such as a smart phone, a computer, or the like.

In the present embodiment, it is assumed that a plurality of predetermined objects 40 (for example, road cones) are installed over a traffic disturbance site on a road on which the vehicle 10 travels. Examples of the "traffic disturbance site" include a site on the road on which travelling in some lanes is impossible due to roadwork, a traffic accident, or the like, but are not limited thereto. In such a case, the vehicle 10 generates a plurality of captured still images in which scenery (for example, scenery in front of the vehicle 10) outside the vehicle is captured while travelling on the road, and position information at a time when each of the captured still images is generated. In a captured moving image including the plurality of captured still images as a frame, the object 40 starts to be captured when the vehicle 10 approaches a start point of the traffic disturbance site, and the object 40 is no longer captured when the vehicle 10 passes an end point of the traffic disturbance site. The vehicle 10 determines position information of a candidate start point and candidate end point of the traffic disturbance site, based on the object 40 detected in the captured moving image. The vehicle 10 transmits, to the server 20, probe data including the position information of the candidate start point and candidate end point.

The server 20 determines each of the start point and end point of the traffic disturbance site, based on position information of one or more candidate start points and candidate end points that the server 20 received from each of the one or more vehicles 10 as probe data, and stores the determined start point and end point of the traffic disturbance site in a memory as, for example, traffic information. The server 20 can provide the traffic information showing the start point and end point of the traffic disturbance site in response to a request from the client.

As such, with the present embodiment, detailed traffic information showing the start point and end point of the traffic disturbance site is stored in the server 20, rather than traffic information showing, for example, an approximate location of a site or a road link in which a traffic disturbance has occurred. Accordingly, the traffic information stored in the traffic information providing center can become detailed.

Next, each configuration of the information processing system 1 will be described in detail.

Configuration of Vehicle

Figure 2:
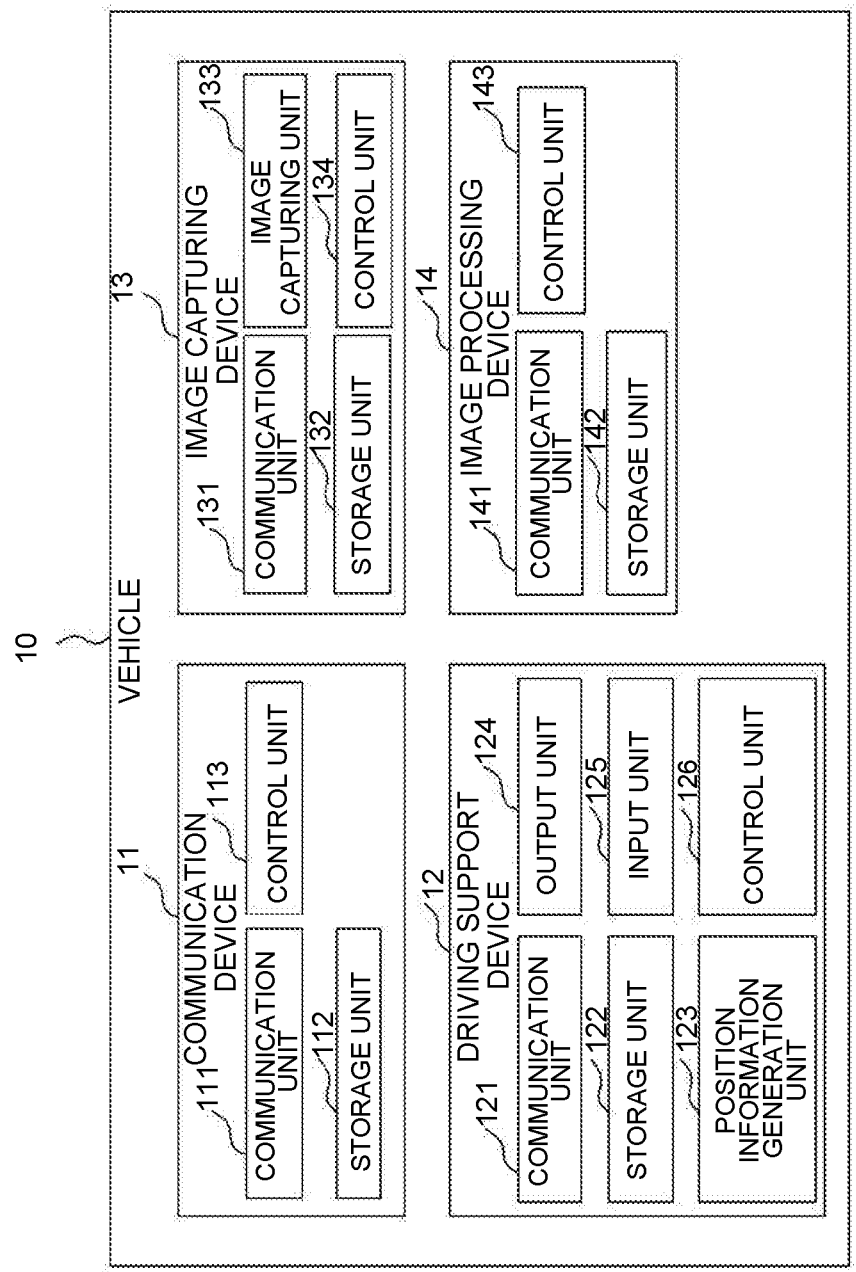
FIG. 2 is a block diagram schematically illustrating a configuration of a vehicle.

The vehicle 10 includes a communication device 11, a driving support device 12, an image capturing device 13, and an image processing device 14, as illustrated in FIG. 2. The communication device 11, the driving support device 12, the image capturing device 13, and the image processing device 14 are connected to be able to communicate with one another via, for example, an in-vehicle network, such as a controller area network (CAN) and the like, or a dedicated line.

The communication device 11 is, for example, an in-vehicle communicator, such as a data communication module (DCM) and the like. Specifically, the communication device 11 includes a communication unit 111, a storage unit 112, and a control unit 113.

The communication unit 111 includes a communication module that communicates via the in-vehicle network or a dedicated line. In addition, the communication unit 111 includes a communication module connected to the network 30. For example, the communication unit 111 may include a communication module corresponding to a mobile communication standard, such as fourth generation (4G) and fifth generation (5G) mobile communication, and the like. In the present embodiment, the vehicle 10 is connected to the network 30 via the communication unit 111.

The storage unit 112 includes one or more memories. In the present embodiment, the "memory" is, for example, a semiconductor memory, a magnetic memory, or an optic memory, but is not limited thereto. Each memory included in the storage unit 112 may function as, for example, a primary storage device, a secondary storage device, or a cache memory. The storage unit 112 stores any information used for an operation of the communication device 11. For example, the storage unit 112 may store a system program, an application program, embedded software, and identification information of the vehicle 10. Here, identification information of the communication device 11, the driving support device 12, the image capturing device 13, or the image processing device 14 provided in the vehicle 10 may be used as the identification information of the vehicle 10. The information stored in the storage unit 112 may be updated with, for example, information acquired from the network 30 via the communication unit 111.

The control unit 113 includes one or more processors. In the present embodiment, the "processor" is a general-purpose processor, or a processor dedicated to a specific process, but is not limited thereto. The control unit 113 controls overall operation of the communication device 11. In the present embodiment, the vehicle 10 and the server 20 communicate with each other via the communication device 11 that is controlled by the control unit 113.

For example, the control unit 113 transmits the probe data to the server 20 via the communication unit 111 and the network 30. In the present embodiment, the probe data includes the identification information of the vehicle 10, identification information of a road on which the vehicle 10 is travelling, position information of a candidate start point and candidate end point of a traffic disturbance site which the vehicle 10 has passed on the road, a candidate start point image, and a candidate end point image. The identification information of the road on which the vehicle 10 is travelling is acquired from the driving support device 12. Examples of the identification information of the road include a road link ID on a road map, but are not limited thereto. The position information of the candidate start point and candidate end point, the candidate start point image, and the candidate end point image are acquired from the image processing device 14, and details of the above information will be described below. The probe data is not limited to the above-described information, but may further include any information on the vehicle 10 such as speed, acceleration, and steering angle of the vehicle 10, travelling route information determined by the driving support device 12, and the like.

The driving support device 12 executes driving support for the vehicle 10. The driving support is, for example, travelling route guidance to a destination, or autonomous driving, but is not limited thereto. Autonomous driving includes, for example, levels 1 to 5 as defined by the Society of Automotive Engineers (SAE), but is not limited thereto, and may be discretionarily defined. The driving support may be executed via cooperation between the driving support device 12, and an electronic control unit (ECU) and the like of the vehicle 10. The driving support device 12 is, for example, a navigation device or an autonomous driving control device mounted on the vehicle 10, but is not limited thereto. Specifically, the driving support device 12 includes a communication unit 121, a storage unit 122, a position information generation unit 123, an output unit 124, an input unit 125, and a control unit 126.

The communication unit 121 includes a communication module that communicates via the in-vehicle network or a dedicated line.

The storage unit 122 includes one or more memories. Each memory included in the storage unit 122 may function as, for example, a primary storage device, a secondary storage device, or a cache memory. The storage unit 122 stores any information used for an operation of the driving support device 12. For example, the storage unit 122 may store a system program, an application program, embedded software, and road map information. The information stored in the storage unit 122 may be updated with, for example, information acquired from the network 30 via the communication device 11.

The position information generation unit 123 includes one or more receivers corresponding to any global navigation satellite system (GNSS). For example, the position information generation unit 123 may include a global positioning system (GPS) receiver. The position information generation unit 123 generates position information of the vehicle 10 on which the driving support device 12 is mounted, based on information received from the GNSS. The position information includes information showing a date and time when the position information is generated.

The output unit 124 includes one or more output interfaces that provides information to a user by outputting the information. For example, the output interface included in the output unit 124 is a display that outputs information in the form of video, or a speaker that outputs information in the form of audio, but is not limited thereto. Examples of the display include a panel display or a head-up display, but are not limited thereto. In the present embodiment, the "video" may include text, a still image, and a moving image.

The input unit 125 includes one or more input interfaces that detect a user input. Examples of the input interface included in the input unit 125 include a physical key, a capacitive key, a touch screen integrally installed with the panel display of the output unit 124, or a microphone that receives an audio input, but are not limited thereto.

The control unit 126 includes one or more processors. The control unit 126 controls overall operation of the driving support device 12.

For example, the control unit 126 determines travelling route information from a current position to the destination of the vehicle 10, and executes the driving support based on the travelling route information. In addition, the control unit 126 outputs the identification information of the road on which the vehicle 10 is travelling to the communication device 11 via the communication unit 121. Moreover, the control unit 126 outputs the position information of the vehicle 10 generated by the position information generation unit 123 to the image processing device 14.

Further, the control unit 126 transmits a request for acquisition of traffic information to the server 20 via the communication device 11. The transmission of the request for acquisition may be executed in response to a predetermined user input to the input unit 125, or may be executed automatically. The control unit 126 receives, via the communication device 11, the traffic information transmitted from the server 20 in response to the request for acquisition. As will be described below, the traffic information includes the position information of the start point and end point of the traffic disturbance site on the road, the start point image showing the scenery of the start point, and the end point image showing the scenery of the end point. The control unit 126 provides the received traffic information to the user by outputting the traffic information via the output unit 124. For example, the start point and end point of the traffic disturbance site may be displayed on the road map shown on a display of the output unit 124. In addition, the start point image or the end point image may be displayed according to a user input selecting the start point or the end point on the road map.

The image capturing device 13 generates a captured still image in which scenery outside a vehicle 10 is captured. In the present embodiment, the image capturing device 13 is provided in the vehicle 10 so as to be able to capture the scenery outside the vehicle 10. Examples of the image capturing device 13 include an in-vehicle camera or a drive recorder used for the driving support for the vehicle 10, but are not limited thereto. Specifically, the image capturing device 13 includes a communication unit 131, a storage unit 132, an image capturing unit 133, and a control unit 134.

The communication unit 131 includes a communication module that communicates via the in-vehicle network or a dedicated line.

The storage unit 132 includes one or more memories. Each memory included in the storage unit 132 may function as, for example, a primary storage device, a secondary storage device, or a cache memory. The storage unit 132 stores any information used for an operation of the image capturing device 13. For example, the storage unit 132 may store a system program, an application program, and embedded software. The information stored in the storage unit 132 may be updated with, for example, information acquired from the network 30 via the communication device 11.

The image capturing unit 133 includes an optical element, such as a lens and the like, and an image sensor. In the present embodiment, examples of the "image sensor" include a complementary metal-oxide-semiconductor (CMOS) image sensor or a charge-coupled device (CCD) image sensor, but are not limited thereto.

The control unit 134 includes one or more processors. The control unit 134 controls overall operation of the image capturing device 13.

For example, the control unit 134 generates, via the image capturing unit 133, a plurality of captured still images in which scenery outside the vehicle 10 is captured (for example, the scenery in front of the vehicle 10) at a predetermined frame rate (for example, 60 fps). Here, the control unit 134 may generate the plurality of captured still images while the vehicle 10 is travelling at a speed equal to or above a predetermined value. The captured still image includes information showing a date and time when the captured still image is generated. The control unit 134 outputs the generated plurality of captured still images to the image processing device 14 via the communication unit 131. Here, the plurality of captured still images may be output as a captured moving image that includes each of the plurality of captured still images as a frame. In other words, the control unit 134 may output the plurality of captured still images as a plurality of still image files (for example, JPG files), or as one moving image file (for example, an AVI file).

The image processing device 14 is an information processing device that processes an image acquired from the image capturing device 13. In the present embodiment, the image processing device 14 determines the candidate start point and candidate end point of the traffic disturbance site based on the captured moving image generated at the time when the vehicle 10 passes the traffic disturbance site. Specifically, the image processing device 14 includes a communication unit 141, a storage unit 142, and a control unit 143.

The communication unit 141 includes a communication module that communicates via the in-vehicle network or a dedicated line.

The storage unit 142 includes one or more memories. Each memory included in the storage unit 142 may function as, for example, a primary storage device, a secondary storage device, or a cache memory. The storage unit 142 stores any information used for an operation of the image processing device 14. For example, the storage unit 142 may store a system program, an application program, and embedded software. The information stored in the storage unit 142 may be updated with, for example, information acquired from the network 30 via the communication device 11.

The control unit 143 includes one or more processors. The control unit 143 controls overall operation of the image processing device 14.

For example, the control unit 143 acquires the above-described plurality of captured still images from the image capturing device 13 via the communication unit 141. The control unit 143 acquires the position information of the vehicle 10 at the time when each of the plurality of captured still images is generated, from the driving support device 12 via the communication unit 141. Specifically, the control unit 143 acquires a plurality of pieces of position information having different generation dates and times, and determines, from among the plurality of pieces of position information, one piece of position information having a generation date and time that approximately matches that of a captured still image, as the position information of the vehicle 10 at the time when the captured still image is generated. However, a method of acquiring the position information at the time when the captured still image is generated is not limited to the above example. For example, it is possible to use a method of synchronizing the time when the position information of the vehicle 10 is generated at the driving support device 12 and the time when the captured still image is generated at the image capturing device 13, and acquiring position information that is generated at the same time that each of the captured still images included in the captured moving image is generated.

The control unit 143 starts a detection process of detecting the object 40 in the captured moving image that includes each of the plurality of captured still images as a frame. As described above, examples of the object 40 include a road cone, but are not limited thereto, and may include any plurality of items installed over the traffic disturbance site on the road. To detect the object 40, any image recognition algorithm, such as pattern matching, feature extraction, or the like, can be employed.

The control unit 143 calculates the number of times that the predetermined object 40 is detected in a section of a predetermined amount of time of the captured moving image while changing the position of the corresponding section in the captured moving image. This will be described in detail with reference to FIGS. 3 to 7.

Figure 3:
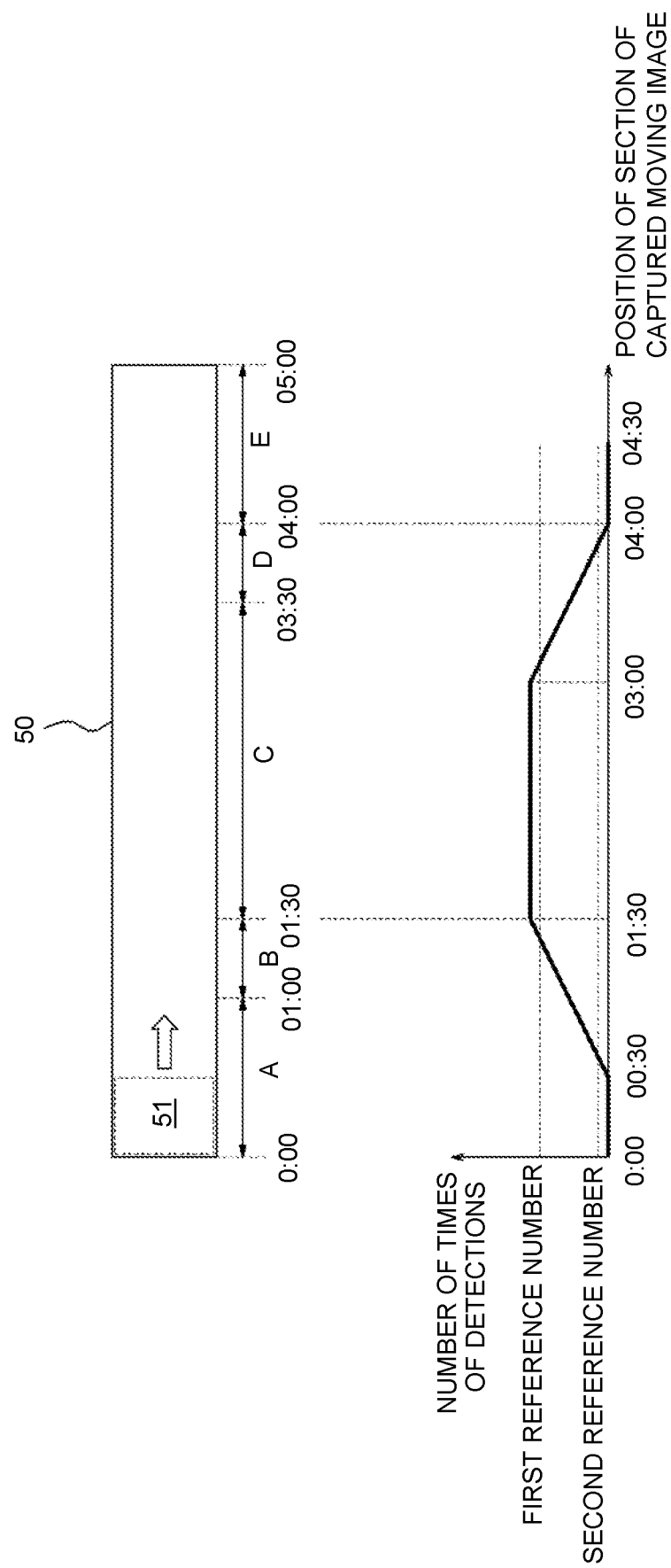
FIG. 3 is a diagram that illustrates a captured moving image in the form of a timeline at the upper part of the diagram, and a change in the number of times that an object is detected according to a position of a section of the captured moving image in the form of a graph at the lower part of the diagram.

The upper part of FIG. 3 is a diagram illustrating, in the form of a timeline, the captured moving image 50 that is generated when the vehicle 10 travelling in the left lane passes the traffic disturbance site in which travelling in the right lane is prohibited, as illustrated in FIG. 1. In the time line, the position (playback position) in the captured moving image 50 is represented by the time when the start position of the moving image is set as a reference ("00:00"). In the present embodiment, the total length of the captured moving image 50 (5 minutes in the example shown in FIG. 3) is assumed to be sufficiently long compared to the predetermined time (30 seconds in the example shown in FIG. 3), which is the length of one section 51 of the captured moving image 50. The captured moving image 50 generated when the vehicle 10 passes the traffic disturbance site includes five scenes (A to E) according to the positional relationship between the vehicle 10 and the traffic disturbance site. Here, for convenience of description, it is assumed that the objects 40 are arranged in line at approximately equal intervals over the traffic disturbance site.

Figure 4:
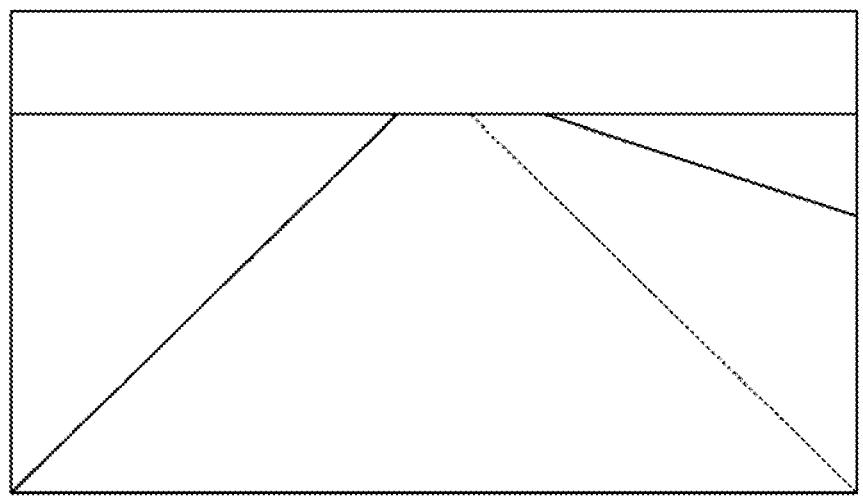
FIG. 4 is a diagram illustrating an example of a captured still image of each of scenes A and E in FIG. 3.

In the first scene A, the vehicle 10 is travelling sufficiently away from the traffic disturbance site, and the object 40 is not included in the field of vision (capturing range) of the image capturing device 13. Accordingly, for example, as illustrated in FIG. 4, the object 40 is not captured in any of the captured still images generated in scene A.

Figure 5:
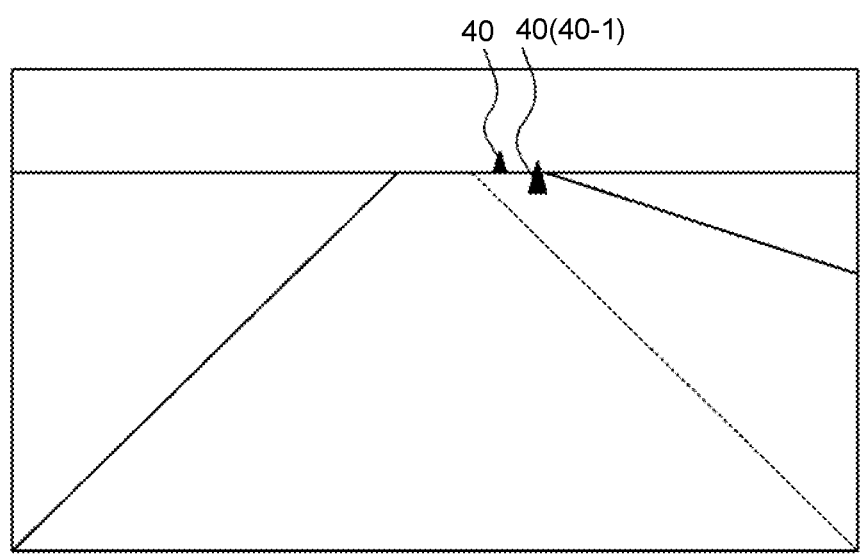
FIG. 5 is a diagram illustrating an example of a captured still image of scene B in FIG. 3.

In the following scene B, the vehicle 10 is approaching the start point of the traffic disturbance site, and the first object 40-1 of n number of objects 40 (40-1 to 40-n) installed in the traffic disturbance site is included in the field of vision of the image capturing device 13. Accordingly, for example, as illustrated in FIG. 5, the object 40-1 is captured in each captured still image generated in scene B.

Figure 6:
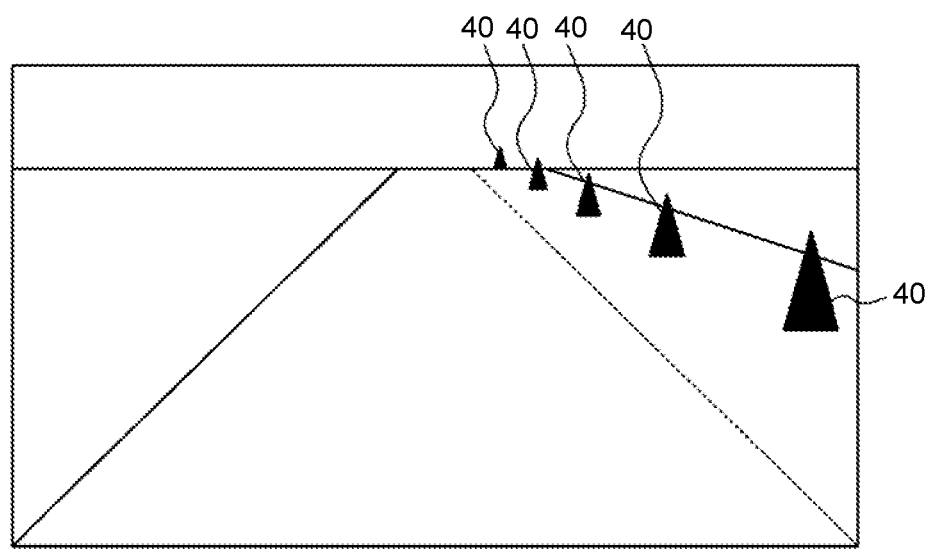
FIG. 6 is a diagram illustrating an example of a captured still image of scene C in FIG. 3.

Around the time when the scene changes from scene B to scene C, the vehicle 10 passes the start point of the traffic disturbance site. In scene C, the vehicle 10 that has passed the start point of the traffic disturbance site is travelling in the traffic disturbance site, and one or more objects 40, excluding the first object 40-1 and the last object 40-n, can be included in the field of vision of the image capturing device 13. Accordingly, for example, as illustrated in FIG. 6, one or more objects 40, excluding the first object 40-1 and the last object 40-n, may be captured in each captured still image generated in scene C.

Figure 7:
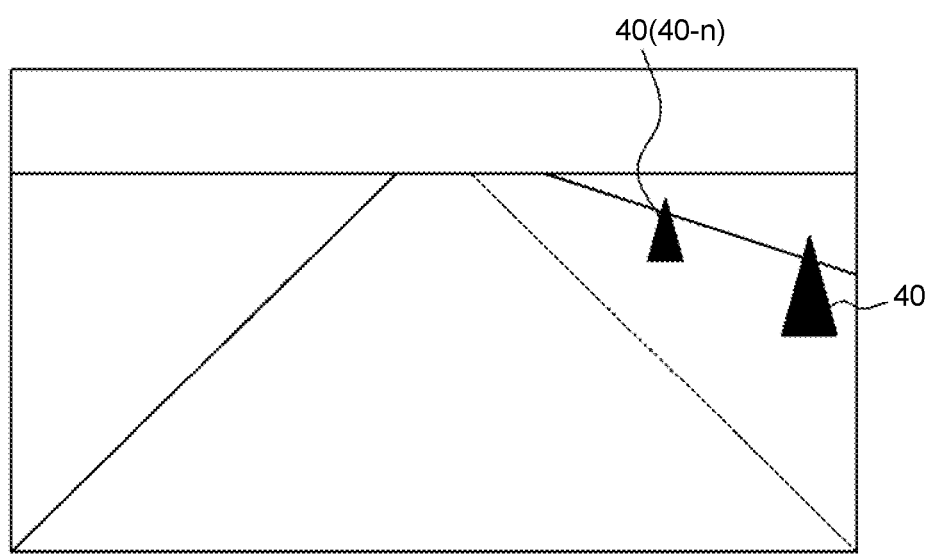
FIG. 7 is a diagram illustrating an example of a captured still image of scene D in FIG. 3.

In the following scene D, the vehicle 10 is approaching the end point of the traffic disturbance site, and the last object 40-n is included in the field of vision of the image capturing device 13. Accordingly, for example, as illustrated in FIG. 7, the last object 40-n is captured in each captured still image generated in scene D.

Around the time when the scene changes from scene D to scene E, the vehicle 10 passes the end point of the traffic disturbance site. In scene E, the vehicle 10 has passed the end point of the traffic disturbance site, and the last object 40-n is not included in the field of vision of the image capturing device 13. Accordingly, for example, as illustrated in FIG. 4, the object 40 is not captured in any of the captured still images generated in scene E.

The control unit 143 detects the object 40 in each captured still image included in the section 51 of a predetermined amount of time of the captured moving image 50, and counts the number of times that the object 40 is detected. The method of counting the number of times that the object 40 is detected may be discretionarily determined. For example, when any one of the objects 40 is captured in n number of captured still images (where n is an integer number equal to or higher than 2), the control unit 143 may determine the number of times that the object 40 is detected in the n number of captured still images as "n", or as "1" by recognizing that the object 40 in the n number of captured still images is the same item. Upon determining the number of times that the object 40 is detected in the section 51, the control unit 143 moves the position of the section 51 in the captured moving image 50 in the direction of the progress of time (in the rightward direction in FIG. 3), and repeats the process of determining the number of times that the object 40 is detected. In this manner, the control unit 143 calculates the number of times that the object 40 is detected in the section 51 while changing the position of the section 51 in the captured moving image 50.

When the position of the section 51 in the captured moving image 50 changes, the number of times that the object 40 is detected can also change. The change in the number of times that the object 40 is detected according to the change in the position of the section 51 in the captured moving image 50 will be described with reference to the lower part of FIG. 3. The lower part of FIG. 3 illustrates a graph in which the X-axis represents the position of the section 51 in the captured moving image 50 (the position of the left end of the section 51 at the upper part of FIG. 3), and the Y-axis represents the number of times that the object 40 is detected in the section 51. In the example illustrated in FIG. 3, since the entire section 51 is included in scene A during a period in which the position of the section 51 changes from "00:00" to "00:30", the number of times that the object 40 is detected is zero. Subsequently, since at least a part of the section 51 is included in scene B during a period in which the position of the section 51 changes from "00:30" to "01:30", the number of times that the object 40 is detected increases. Subsequently, since the entire section 51 is included in scene C during a period in which the position of the section 51 changes from "01:30" to "03:00", the number of times that the object 40 is detected does not substantially change. Subsequently, since at least a part of the section 51 is included in scene D during a period in which the position of the section 51 changes from "03:00" to "04:00", the number of times that the object 40 is detected decreases. Since the entire section 51 is included in scene E during a period in which the position of the section 51 changes from "04:00" to "04:30", the number of times that the object 40 is detected is zero.

The control unit 143 determines the position information of the candidate start point of the traffic disturbance site based on the result of calculating the number of times that the object 40 is detected. The candidate start point may be any point located within a certain distance range from the start point. In other words, the position information of the candidate start point of the traffic disturbance site that is determined by the control unit 143 does not strictly have to be equal to the position information of the start point of the traffic disturbance site. Details will be described with reference to FIG. 3.

For example, when a section 51 at any position in the captured moving image 50 includes a captured still image generated at the time when the vehicle 10 passes the start point of the traffic disturbance site (the captured still image corresponding to position of "01:30" when a scene changes from scene B to scene C, in the example illustrated in FIG. 3), the position information of the vehicle 10 at the time when each captured still image in the corresponding section 51 is generated can be regarded as the position information of the candidate start point of the traffic disturbance site. In the present embodiment, the control unit 143 determines whether the calculated number of times that the object 40 is detected exceeds a first reference number. Here, the "first reference number" can be determined in advance by experiment or simulation, such that the captured still image generated at the time when the vehicle 10 passes the start point of the traffic disturbance site may be included in the section 51 when the number of times that the object 40 is detected exceeds the first reference number.

Upon determining that the number of times that the object 40 is detected exceeds the first reference number, the control unit 143 specifies at least one captured still image included in the section 51 when the number of times that the object 40 is detected exceeds the first reference number. The control unit 143 determines the position information of the candidate start point of the traffic disturbance site based on the position information of the vehicle 10 at the time when the specified at least one captured still image is generated. Specifically, when one captured still image included in the section 51 is specified, the control unit 143 may determine the position information of the vehicle 10 at the time when the one captured still image is generated as the position information of the candidate start point of the traffic disturbance site. Alternatively, when two or more captured still images included in the section 51 are specified, the control unit 143 may determine the average of the position information of the vehicle 10 when each of the two or more captured still images is generated as the position information of the candidate start point of the traffic disturbance site. In addition, the control unit 143 determines any one of the specified at least one captured still images as a candidate start point image. The candidate start point image is used by the server 20 to determine a start point image showing scenery of the start point of the traffic disturbance site, as will be described below.

Moreover, the control unit 143 determines the position information of the candidate end point of the traffic disturbance site based on the result of calculating the number of times that the object 40 is detected. The candidate end point may be any point located within a certain distance range from the end point. In other words, the position information of the candidate end point of the traffic disturbance site that is determined by the control unit 143 does not strictly have to be equal to the position information of the end point of the traffic disturbance site. The position information of the candidate end point can be made determined in a similar manner as the position information of the candidate start point, which is determined as described above.

Specifically, when a section 51 at any position in the captured moving image 50 includes a captured still image that is generated at the time when the vehicle 10 passes the end point of the traffic disturbance site (the captured still image corresponding to "04:00" when a scene changes from scene D to scene E, in the example illustrated in FIG. 3), the position information of the vehicle 10 at the time when each captured still image in the corresponding section 51 is generated can be regarded as the position information of the candidate end point of the traffic disturbance site. In the present embodiment, the control unit 143 monitors the calculated number of times that the object 40 is detected, and determines whether the calculated number of times that the object 40 is detected is equal to or below a second reference number. Here, the "second reference number" can be determined in advance by experiment or simulation, such that the captured still image that is generated at the time when the vehicle 10 passes the end point of the traffic disturbance site may be included in the section 51 when the number of times that the object 40 is detected is equal to or below the second reference number. For example, the second reference number may be equal to or above zero, and equal to or below the first reference number.

Upon determining that the number of times that the object 40 is detected is equal to or below the second reference number, the control unit 143 specifies at least one captured still image included in the section 51 at the time when the number of times that the object 40 is detected is equal to or below the second reference number. The control unit 143 determines the position information of the candidate end point of the traffic disturbance site based on the position information of the vehicle 10 at the time when the specified at least one captured still image is generated. Specifically, when one captured still image included in the section 51 is specified, the control unit 143 may determine the position information of the vehicle 10 when the one captured still image is generated as the position information of the candidate end point of the traffic disturbance site. Alternatively, when two or more captured still images included in the section 51 are specified, the control unit 143 may determine the average of the position information of the vehicle 10 at the time when each of the two or more captured still images is generated as the position information of the candidate end point of the traffic disturbance site. In addition, the control unit 143 determines any one of the specified two or more captured still images as a candidate end point image. The candidate end point image is used by the server 20 to determine an end point image showing scenery of the end point of the traffic disturbance site, as will be described below.

The control unit 143 outputs, to the communication device 11 via the communication unit 141, the position information of the candidate start point and candidate end point, the candidate start point image, and the candidate end point image that are determined as described above. The above output information is transmitted together with the identification information of the vehicle 10 as probe data from the communication device 11 to the server 20 as described above.

Configuration of Server

Figure 8:
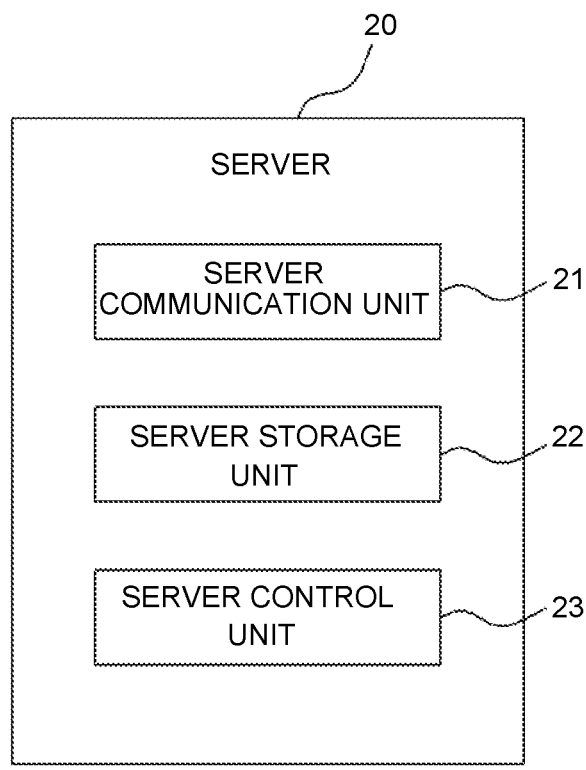
FIG. 8 is a block diagram schematically illustrating a configuration of a server.

The server 20 includes a server communication unit 21, a server storage unit 22, and a server control unit 23, as illustrated in FIG. 8.

The server communication unit 21 includes a communication module connected to the network 30. For example, the server communication unit 21 may include a communication module corresponding to a wired local area network (LAN) standard. In the present embodiment, the server 20 is connected to the network 30 via the server communication unit 21.

The server storage unit 22 includes one or more memories. Each memory included in the server storage unit 22 may function as, for example, a primary storage device, a secondary storage device, or a cache memory. The server storage unit 22 stores any information used for an operation of the server 20. For example, the server storage unit 22 may store a system program, an application program, road map information, and a database that stores the probe data received from the vehicle 10. The information stored in the server storage unit 22 may be updated with, for example, information acquired from the network 30 via the server communication unit 21.

The server control unit 23 includes one or more processors. The server control unit 23 controls overall operation of the server 20. For example, the server control unit 23 may be able to recognize the travelling state of each vehicle 10 by referring to the database stored in the server storage unit 22.

In addition, upon receiving the probe data from the vehicle 10 via the server communication unit 21, the server control unit 23 stores the probe data in the database of the server storage unit 22. For convenience of description, the database shown in FIG. 9 illustrates, among the information included in the probe data, the identification information of the road, the identification information of the vehicle 10, the position information of the candidate start point, the position information of the candidate end point, the candidate start point image, and the candidate end point image. Further, FIG. 9 illustrates two pieces of probe data which have been respectively received from two vehicles 10 (V1, V2) that have traveled on a road (R1).

The server control unit 23 refers to the database and determines position information of each of a start point and end point of a traffic disturbance site for each road. Specifically, the server control unit 23 specifies one or more vehicles 10 associated with any one road in the database. Based on position information of a candidate start point and candidate end point determined associated with the specified one or more vehicles 10 (i.e., the position information of the candidate start point and candidate end point associated with the one or more vehicles 10 in the database), the server control unit 23 determines the position information of the start point and end point of the traffic disturbance site on the road. For example, the server control unit 23 determines, as the position information of the start point and end point, the average of the position information of the candidate start point and the average of the position information of the candidate end point associated with the one or more vehicles 10, respectively. However, the method of determining the position information of the start point and end point is not limited thereto, and any statistical technique may be employed.

The server control unit 23 refers to the database and determines the start point image and end point image associated with the start point and end point of the traffic disturbance site, respectively. Specifically, the server control unit 23 specifies any one vehicle 10 associated with a road on which the traffic disturbance site exists in the database, and determines a candidate start point image associated with the one vehicle 10 as a start point image. Here, when there are a plurality of vehicles 10 associated with the road in the database, one vehicle 10 may be randomly specified from among the plurality of vehicles 10, or one vehicle 10 having position information of a candidate start point that is closest to the position information of the start point may be specified from among the plurality of vehicles 10. In the same manner, the server control unit 23 specifies any one vehicle 10 associated with a road on which the traffic disturbance site exists in the database, and determines a candidate end point image associated with the one vehicle 10 as an end point image. Here, when there are a plurality of vehicles 10 associated with the road in the database, one vehicle 10 may be randomly specified from among the plurality of vehicles 10, or one vehicle 10 having position information of a candidate end point that is closest to the position information of the end point may be specified from among the plurality of vehicles 10.

Upon determining the position information of the start point and end point, the start point image, and the end point image of the traffic disturbance site for each road, the server control unit 23 stores these information in the server storage unit 22 as traffic information. The server control unit 23 outputs the traffic information stored in the server storage unit 22 to the client via the server communication unit 21. For example, the traffic information may be distributed in a pull-based manner in response to a request from the client, or distributed from the server 20 in a push-based manner.

When the server control unit 23 determines the position information of the start point and end point, the start point image, and the end point image of the traffic disturbance site on the road and then receives new probe data from the vehicle 10 that passes the traffic disturbance site, the server control unit 23 may store the new probe data in the database and update the traffic information by redetermining the position information of the start point and end point, the start point image, and the end point image of the traffic disturbance site.

Operation Flow of Vehicle

Figure 10:
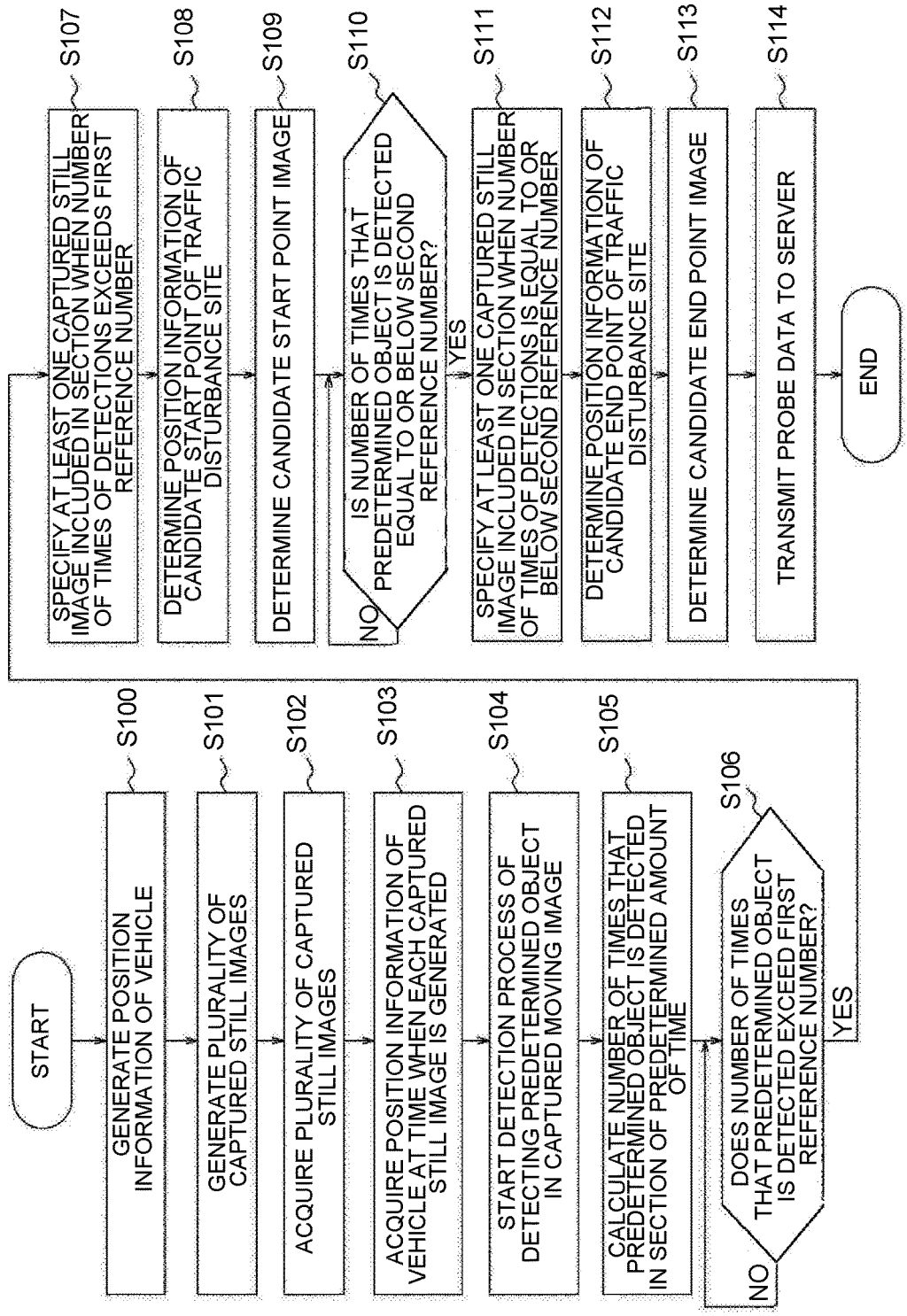
FIG. 10 is a flowchart illustrating an operation of the vehicle.

An operation flow of the vehicle 10 will be described with reference to FIG. 10. Here, the vehicle 10 is assumed to be travelling on a road on which a traffic disturbance site exists.

Step S100: the driving support device 12 of the vehicle 10 generates the position information of the vehicle 10.

Step S101: the image capturing device 13 of the vehicle 10 generates a plurality of captured still images in which the scenery outside the vehicle 10 is captured. In addition, steps S100 and S101 are executed while the vehicle 10 is travelling at a speed equal to or above the predetermined value.

Step S102: the image processing device 14 of the vehicle 10 acquires a plurality of captured still images from the image capturing device 13.

Step S103: the image processing device 14 of the vehicle 10 acquires, from the driving support device 12, the position information of the vehicle 10 at the time when each of the plurality of captured still images is generated.

Step S104: the image processing device 14 of the vehicle 10 starts the detection process of detecting the predetermined object 40 in the captured moving image 50 that includes each of the plurality of captured still images as a frame.

Step S105: the image processing device 14 of the vehicle 10 calculates the number of times that the object 40 is detected in the section 51 of a predetermined amount of time of the captured moving image 50 while changing the position of the section 51 in the captured moving image 50. When the position of the section 51 in the captured moving image 50 changes, the number of times that the object 40 is detected can also change.

Step S106: the image processing device 14 of the vehicle 10 determines whether the number of times that the object 40 is detected exceeds the first reference number. When the image processing device 14 determines that the number of times that the object 40 is detected exceeds the first reference number (YES in step S106), the process proceeds to step S107. On the other hand, when the image processing device 14 determines that the number of times that the object 40 is detected does not exceed the first reference number (NO in step S106), the process repeats step S106.

Step S107: the image processing device 14 of the vehicle 10 specifies at least one captured still image included in the section 51 when the number of times that the object 40 is detected exceeds the first reference number.

Step S108: the image processing device 14 of the vehicle 10 determines the position information of the candidate start point of the traffic disturbance site on the road, based on the position information of the vehicle 10 at the time when the at least one captured still image specified in step S107 is generated.

Step S109: the image processing device 14 of the vehicle 10 determines, as a candidate start point image, any one of the at least one captured still image specified in step S107.

Step S110: the image processing device 14 of the vehicle 10 determines whether the number of times that the object 40 is detected is equal to or below the second reference number. When the image processing device 14 determines that the number of times that the object 40 is detected is equal to or below the second reference number (YES in step S110), the process proceeds to step S111. On the other hand, when the image processing device 14 determines that the number of times that the object 40 is detected is above the second reference number (NO in step S110), the process repeats step S110.

Step S111: the image processing device 14 of the vehicle 10 specifies at least one captured still image included in the section 51 when the number of times that the object 40 is detected is equal to or below the second reference number.

Step S112: the image processing device 14 of the vehicle 10 determines the position information of the candidate end point of the traffic disturbance site on the road, based on the position information of the vehicle 10 at the time when the at least one captured still image specified in step S111 is generated.

Step S113: the image processing device 14 of the vehicle 10 determines, as a candidate end point image, any one of the at least one captured still image specified in step S111.

Step S114: the vehicle 10 transmits the probe data to the server 20 via the communication device 11. The probe data includes the identification information of the vehicle 10, the identification information of the road on which the vehicle 10 is travelling, the position information of the candidate start point and candidate end point, the candidate start point image, and the candidate end point image of the traffic disturbance site.

Operation Flow of Server

An operation flow of the server 20 will be described with reference to FIG. 11.

Step S200: the server 20 receives the probe data from one or more vehicles 10 that have passed the traffic disturbance site on the road, and stores the probe data in the database. The database includes the identification information of the road, the identification information of the vehicle 10, the position information of the candidate start point, the position information of the candidate end point, the candidate start point image, and the candidate end point image.

Step S201: the server 20 refers to the database and determines the position information of the start point and end point of the traffic disturbance site based on the position information of the candidate start point and candidate end point determined associated with one or more vehicles 10 (i.e., the position information of the candidate start point and candidate end point associated with the one or more vehicles 10 in the database).

Step S202: the server 20 refers to the database and determines the candidate start point image associated with any one of the one or more vehicles 10 as the start point image corresponding to the start point of the traffic disturbance site. Similarly, the server 20 determines the candidate end point image associated with any one of the one or more vehicles 10 as the end point image corresponding to the end point of the traffic disturbance site.

Step S203: the server 20 stores, as the traffic information, the position information of the start point and end point of the traffic disturbance site determined in step S201, and the start point image and end point image determined in step S202.

Step S204: the server 20 outputs the traffic information to the client.

As described above, the information processing system 1 according to the present embodiment generates a plurality of captured still images in which the scenery outside the vehicle 10 is captured, starts the detection process of detecting the object 40 in the captured moving image 50 that includes each of the captured still images as a frame, and calculates the number of times that the object 40 is detected in the section 51 of a predetermined amount of time of the captured moving image 50 while changing the position of the section 51 in the captured moving image 50. The information processing system 1 specifies at least one captured still image included in the section 51 when the number of times that the object 40 is detected exceeds the first reference number, and determines the position information of the candidate start point of the traffic disturbance site on the road based on the position information of the vehicle 10 at the time when the at least one captured still image is generated. Then, the information processing system 1 determines the position information of the start point of the traffic disturbance site based on the position information of the candidate start point determined associated with one or more vehicles 10.

With this configuration, the position information of the start point of the traffic disturbance site is determined based on information from the vehicle 10 that actually passes the traffic disturbance site on the road. For this reason, detailed traffic information showing position information of a start point of a traffic disturbance site is stored in the server 20, rather than traffic information showing, for example, an approximate location of a site or a road link on which a traffic disturbance has occurred. Therefore, the traffic information stored in the traffic information providing center can become more detailed.

The present disclosure was described above with reference to the drawings and the embodiment. However, it is to be noted that a person skilled in the art can easily make variations and modifications thereto, based on the present disclosure. Therefore, it is also to be noted that these variations and modifications fall within the scope of the present disclosure. For example, functions, and the like, included in each element, each step, or the like, can be rearranged so as not to be logically contradictory, and a plurality of elements, steps, or the like, may be combined into one or divided.

For example, in the above-described embodiment, another apparatus may have a part of the configuration and function of each of the communication device 11, the driving support device 12, the image capturing device 13, and the image processing device 14 that are included in the vehicle 10. Further, for example, in the above-described embodiment, one information processing apparatus, or an arbitrary number (two or more) of information processing apparatuses may have the configuration and function of the communication device 11, the driving support device 12, the image capturing device 13, and the image processing device 14. In addition, for example, in the above-described embodiment, a part of the processing operations executed by the vehicle 10 may be executed by the server 20, and a part of the processing operations executed by the server 20 may also be executed by the vehicle 10. For example, in the above-described embodiment, the server 20 may execute the operations that are executed by the vehicle 10, including the detection process, the calculation of the number of times that the object 40 is detected in the section 51 of the captured moving image 50, the determination of the position information of the candidate start point and candidate end point of the traffic disturbance site, and the determination of the candidate start point image and the candidate end point image.

Moreover, in the above-described embodiment, a description was made regarding the method of calculating the number of times that the object 40 is detected in the section 51 of the captured moving image 50, and determining the position information of the candidate end point of the traffic disturbance site based on the section 51 when the number of times that the object 40 is detected becomes equal to or below the second reference number, after the number of times that the object 40 is detected exceeds the first reference number. However, the method of determining the position information of the candidate end point of the traffic disturbance site is not limited to the example described above. For example, the information processing system 1 may monitor whether the object 40 is detected in the captured still image included in the captured moving image 50, and then determine the position information of the candidate start point of the traffic disturbance site in the same manner as in the above-described embodiment, and then determine, as the position information of the candidate end point of the traffic disturbance site, the position information of the vehicle 10 at the time when the captured still image when the object 40 is no longer captured is generated.

Further, in the above-described embodiment, a description was made regarding a situation in which the object 40, such as a road cone, is installed over a traffic disturbance site in which, for example, roadwork is being performed or a traffic accident has occurred. However, the type of traffic disturbance site and the type of the object 40 are not limited to the above-described examples. For example, a site on a road on which travelling is impossible in some lanes due to a plurality of vehicles parked on the road may be set as a traffic disturbance site. In this case, each vehicle parked on the road over the corresponding traffic disturbance site may be set as the object 40.

In addition, in the above-described embodiment, a description was made regarding the example in which the start point and end point of the traffic disturbance site are displayed on the road map that is shown on the display included in the driving support device 12 of the vehicle 10, based on the traffic information received from the server 20. Here, the output unit 124 of the driving support device 12 may provide the user information showing a lane in which travelling is impossible in the traffic disturbance site by outputting information to the user in the form of video or audio. In this case, the probe data transmitted from the vehicle 10 to the server 20 further includes the information showing the lane in which travelling is impossible. Moreover, the traffic information transmitted from the server 20 to the client (for example, the vehicle 10) further includes the information on the lane in which travelling is impossible in the traffic disturbance site, in addition to the position information of the start point and end point of the traffic disturbance site, and the like.

Further, in the above-described embodiment, a description was made regarding the method of calculating the number of times that the object 40 is detected in the section 51 of the captured moving image 50, and determining the position information of the candidate start point and candidate end point of the traffic disturbance site based on the result of calculation. However, the method of determining the position information of the candidate start point and candidate end point of the traffic disturbance site is not limited to the example described above. For example, it is conceivable that an item, such as tape, or the like, which prevents entry of the vehicle 10, is extended over a traffic disturbance site on the road. In such a case, the information processing system 1 may calculate the length of the object 40, such as tape, a pole, or the like, which is detected in the captured moving image 50. The information processing system 1 may specify one captured still image corresponding to a frame at the time when the length of the detected object 40 exceeds a predetermined reference value, and determine, as the position information of the candidate start point of the traffic disturbance site, the position information of the vehicle 10 at the time when the one captured still image is generated. Moreover, the information processing system 1 may specify one captured still image corresponding to a frame at the time when the object 40 is no longer detected, and determine, as the position information of the candidate end point, the position information of the vehicle 10 at the time when the one captured still image is generated.

In addition, in the above-described embodiment, each vehicle 10 included in the information processing system 1 may be a dedicated vehicle such as a probe car, or the like, or a general vehicle used by a general user.

Moreover, a general-purpose information processing apparatus, such as a smart phone, a computer, and the like, may function as the communication device 11, the driving support device 12, the image capturing device 13, or the server 20 according to the above-described embodiment. Specifically, a program describing processing details for implementing each function of the communication device 11, and the like, according to the embodiment is stored in a memory of the information processing apparatus, and the corresponding program is read and executed by a processor of the information processing apparatus. Accordingly, the embodiments of the present disclosure can also be implemented as a program executable by a processor.

What is claimed is:

1. An information processing system comprising:
   a vehicle; and
   a server configured to communicate with the vehicle, wherein:
      the vehicle is configured to generate a plurality of captured still images in which scenery outside the vehicle is captured while travelling on a road, and simultaneously acquire position information of the vehicle at a time when each of the plurality of captured still images is generated;
      the vehicle or the server is configured to execute a detection process of detecting a predetermined object in a captured moving image that includes each of the plurality of captured still images as a frame;

the vehicle or the server is configured to calculate a number of times that the predetermined object is detected in a section of a predetermined amount of time of the captured moving image while changing a start time of the section in the captured moving image;

the vehicle or the server is configured to determine position information of a candidate start point of a traffic disturbance site on the road, based on the position information of the vehicle at a time when at least one captured still image, which is included in the section when the number of times that the predetermined object is detected exceeds a first reference number, is generated; and the server is configured to determine position information of a start point of the traffic disturbance site based on the position information of the candidate start point determined associated with the vehicle, and output the position information of the start point of the traffic disturbance site.

2. The information processing system according to claim 1, wherein:

the vehicle or the server is configured to determine, as a start point image corresponding to the start point, any one of the captured still images included in the section at the time when the number of times that the predetermined object is detected exceeds the first reference number; and the server is configured to output the start point image.

3. The information processing system according to claim 1, wherein the vehicle is configured to generate the plurality of captured still images when the vehicle is travelling at a speed equal to or above a predetermined value.

4. The information processing system according to claim 1, wherein:

the information processing system includes a plurality of vehicles; and the server is configured to determine the position information of the start point of the traffic disturbance site based on position information of a plurality of candidate start points respectively determined on the plurality of vehicles.

5. The information processing system according to claim 1, wherein:

the vehicle or the server is configured to determine position information of a candidate end point of the traffic disturbance site, based on the position information of the vehicle at a time when at least one captured still image, which is included in the section when the number of times that the predetermined object is detected is equal to or below a second reference number, is generated; and the server is configured to determine position information of an end point of the traffic disturbance site based on the position information of the candidate end point that is determined on the vehicle, and output the position information of the end point of the traffic disturbance site.

6. The information processing system according to claim 5, wherein:

the vehicle or the server is configured to determine, as an end point image corresponding to the end point, any one of the captured still images included in the section at the time when the number of times that the predetermined object is detected is equal to or below the second reference number; and the server is configured to output the end point image.

7. The information processing system according to claim 5, wherein the second reference number is equal to or below the first reference number.

8. The information processing system according to claim 5, wherein:

the information processing system includes a plurality of vehicles; and the server is configured to determine the position information of the end point of the traffic disturbance site based on position information of a plurality of candidate end points respectively determined on the plurality of vehicles.

9. A non-transitory storage medium storing a program to cause an information processing apparatus to execute a control method of using the information processing apparatus, wherein the program causes the information processing apparatus to execute a control process, the control process comprising:

acquiring a plurality of captured still images in which a vehicle travelling on a road captures scenery outside the vehicle;

acquiring position information of the vehicle at a time when each of the plurality of captured still images is generated;

starting a detection process of detecting a predetermined object in a captured moving image that includes each of the plurality of captured still images as a frame;

calculating a number of times that the predetermined object is detected in a section of a predetermined amount of time in the captured moving image while changing a start time of the section in the captured moving image;

specifying at least one captured still image included in the section at a time when the number of times that the predetermined object is detected exceeds a first reference number; and determining position information of a candidate start point of a traffic disturbance site on the road, based on the position information of the vehicle at a time when the specified at least one captured still image is generated.

10. A method of controlling an information processing apparatus, the method comprising:

acquiring a plurality of captured still images in which a vehicle travelling on a road captures scenery outside the vehicle;

acquiring position information of the vehicle at a time when each of the plurality of captured still images is generated;

starting a detection process of detecting a predetermined object in a captured moving image that includes each of the plurality of captured still images as a frame;

calculating a number of times that the predetermined object is detected of a section of a predetermined amount of time in the captured moving image while changing a start time of the section in the captured moving image;

specifying at least one captured still images included in the section at a time when the number of times that the predetermined object is detected exceeds a first reference number; and determining position information of a candidate start point of a traffic disturbance site on the road, based on the position information of the vehicle at a time when the specified at least one captured still image is generated.

11. The information processing system according to claim 1, wherein the first reference number is determined in advance by experiment or simulation.

12. The information processing system according to claim 1, wherein the vehicle or server is configured to determine an average of the position information of the vehicle when each of a plurality of captured still images is generated as the position information of the candidate start point of the traffic disturbance site.

* * * * *